(12) United States Patent
Thorn

(10) Patent No.: US 6,332,318 B1
(45) Date of Patent: Dec. 25, 2001

(54) SOLIDIFICATION ENGINE AND THERMAL MANAGEMENT SYSTEM FOR ELECTRONICS

(75) Inventor: Ronald Ray Thorn, Bernardsville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/560,914

(22) Filed: Apr. 28, 2000

(51) Int. Cl.[7] .................................................. F01B 29/00
(52) U.S. Cl. .................................................. 60/512; 60/515
(58) Field of Search .............................. 60/508, 512, 515

(56) References Cited

U.S. PATENT DOCUMENTS

| | | | |
|---|---|---|---|
| 2,115,501 | * 4/1938 | Vernet | 60/527 |
| 2,395,984 | * 3/1946 | Bartholomew | 60/515 |
| 3,027,729 | * 4/1962 | Chace | 60/527 X |
| 4,075,845 | * 2/1978 | Allen | 60/527 |
| 5,927,094 | * 7/1999 | Nickum | 60/525 X |

* cited by examiner

Primary Examiner—Hoang Nguyen

(57) ABSTRACT

A thermal management system is disclosed by selectively breaking the thermal connection between the heat sinks and the electronics being cooled. This preserves the excess heat generated by the electronics rather than dissipating it, thereby maintaining the electronics at or above the minimum specified operating temperature during exposure to extremely cold environments. The thermal connection can be broken in several ways including an electrically controlled device such as an solenoid or via a device that harnesses a phenomenon of the same low temperatures that is the ultimate source of the problem to be solved. A preferred example of such a device is a solidification engine. A solidification engine produces reversible motion based upon the tendency of certain substances to expand with significant force upon freezing and to contract upon melting.

20 Claims, 7 Drawing Sheets

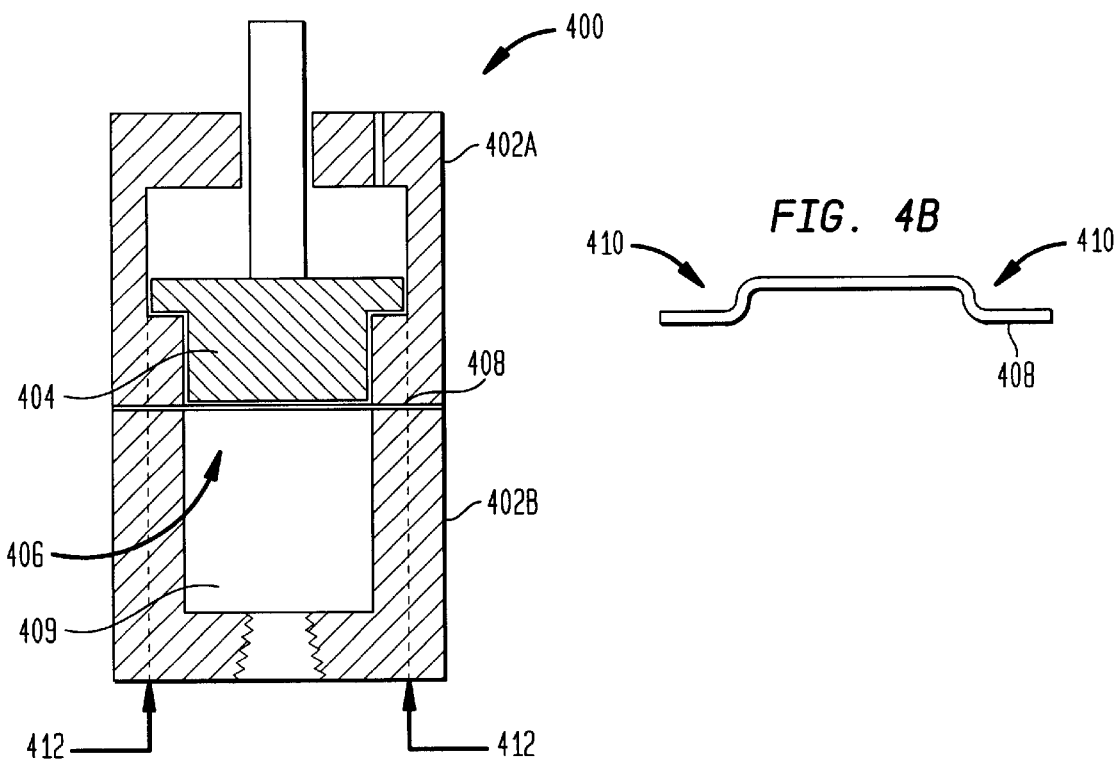
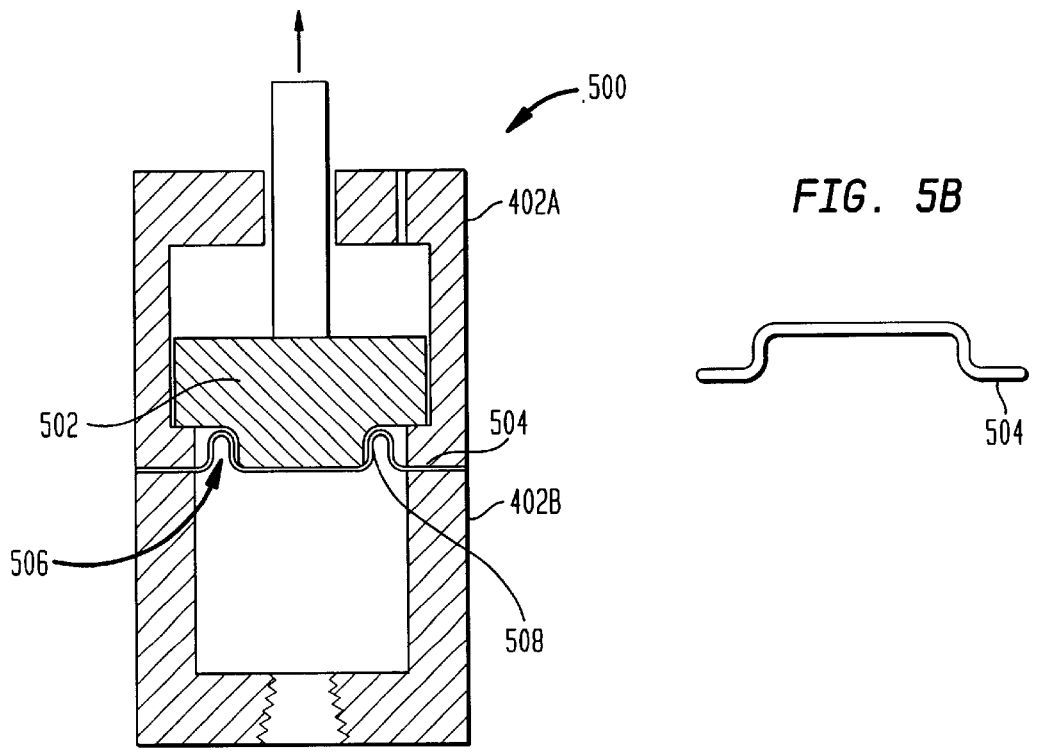

SOLIDIFICATION ENGINE AND THERMAL MANAGEMENT SYSTEM FOR ELECTRONICS

FIELD OF THE INVENTION

The invention is generally directed toward a thermal management system for electronics, especially in outdoor settings, and more particularly to such a thermal management system adapted for a wide range of temperatures (e.g., −40° C. to 46° C.), and more particularly to such a system employing a solidification engine.

BACKGROUND OF THE INVENTION

The electronic circuitry (electronics) used to provide telephony, cable television and data communication, including wireless communication, etc., inevitably generates excess heat. Because such electronics can only function properly within a specified temperature range, e.g., −20° C. to 70° C., dissipation of the excess heat must be managed. A typical solution is to provide a thermal path from inside an electronics enclosure to large heat sinks located outside the enclosure. The heat sinks are sized to dissipate enough excess heat to maintain the electronics at a temperature at or below their maximum rated operating temperature when the external ambient temperature reaches an expected maximum, e.g., 46° C.

The Background Art thermal management system of heat sinks is effective at keeping the operating temperature of the electronics at or below their maximum operating temperature. Unfortunately, the heat sink-based system becomes a liability at low temperatures. When the external ambient temperature falls below the required minimum for the electronics, they still must be maintained at or above the required minimum temperature. The heat sinks work contrary to this by dissipating the now-potentially useful heat generated by the electronics to outside the cabinet.

A Background Art solution to this problem has been to provide heaters that can be activated at lower temperatures to provide additional heat so that the resulting operating temperature stays at or above the specified minimum operating temperature of the electronics. But this has some disadvantages.

The power supply must be adequate to run the electronics as well as the heater circuitry, i.e., much larger than needed to merely run the electronics. Also, such heating circuitry is needed infrequently, for example on the order of 8–10 times per year. This type of solution is very costly in terms of the frequency of its use. A typical battery backup system for the electronics does not have the capacity to provide the tremendous power required by the heating circuitry. It is noted that power outages due to extreme temperatures can occur at very low temperatures as well as very high temperatures. The infrequency of the need for the heater circuitry, compounded by the likelihood of its unavailability due to power outages, makes this low temperature compensation scheme even less useful.

SUMMARY OF THE INVENTION

The invention, in part, is a recognition that (especially for outdoor settings) it is more efficient to disable the Background Art thermal management system at low operating temperatures than it is to generate additional heat as described above.

The invention, in part, is recognition that the Background Art thermal management system can be disabled by selectively breaking the thermal connection between the heat sinks and the electronics being cooled. This has the advantage that the excess heat generated by the electronics is preserved rather than dissipated, which can maintain the electronics at or above the minimum specified operating temperature.

The invention, also in part, is a recognition that the thermal connection can be broken several ways, including a thermostatically controlled electrical device such as an solenoid or via a device (e.g., a bimetallic or other thermally-reactive spring) that harnesses a phenomenon of the same low temperatures that is the ultimate source of the problem to be solved. A preferred example of such a device is a solidification engine, which is a type of phase transition engine.

The invention, also in part, provides a solidification engine that produces reversible motion based upon the tendency of certain substances to expand with a significant force upon freezing and to contract upon melting.

The invention, also in part, provides a solidification engine comprising: an enclosure having an opening; a substance in said enclosure, that expands (with a significant force) upon transition from a liquid to a solid; and a movable plug assembly fitted to said opening in said enclosure to seal said substance. Reversible motion of said movable plug assembly relative to said confinement chamber is imparted when said substance freezes from a liquid to a solid or melts from a solid to a liquid.

A solidification engine using water will operate as follows. As water turns to ice it expands. That expansion creates a force. The expansion force of ice is greater than approximately 30,000 lbs. per square foot and the volume of ice is approximately 1.0855 that of water. That expansion and force can be used to de-couple a heatsink from a heat source as the temperature drops, and re-couple them together when the temperature rises.

The invention also, in part, provides a thermal management system comprising: a structure to be cooled; a heat sink thermally connected to the structure-to-be-cooled; an engine or engines arranged to break the thermal connection between said heat sink and said structure-to-be-cooled depending upon a temperature to which said solidification engine is exposed.

The invention also, in part, provides a solidification engine comprising: a male part and a corresponding female part that together define an enclosure; and a substance, in said enclosure, that expands upon transition from a liquid to a solid; wherein reversible motion of said male part relative to said female part is imparted when said substance freezes from a liquid to a solid or melts from a solid to a liquid.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

FIG. 4A is a cross-section of a second embodiment of a solidification engine according to the invention.

FIG. 4B is an abbreviated cross-section depicting the distension of the stretchable membrane 408 of FIG. 4A.

FIG. 5A is a third embodiment of the solidification engine according to the invention.

FIG. 5B is a abbreviated cross-section depicting the unfolded configuration of the stretch resistant membrane 504 of FIG. 5A.

Figure 8:
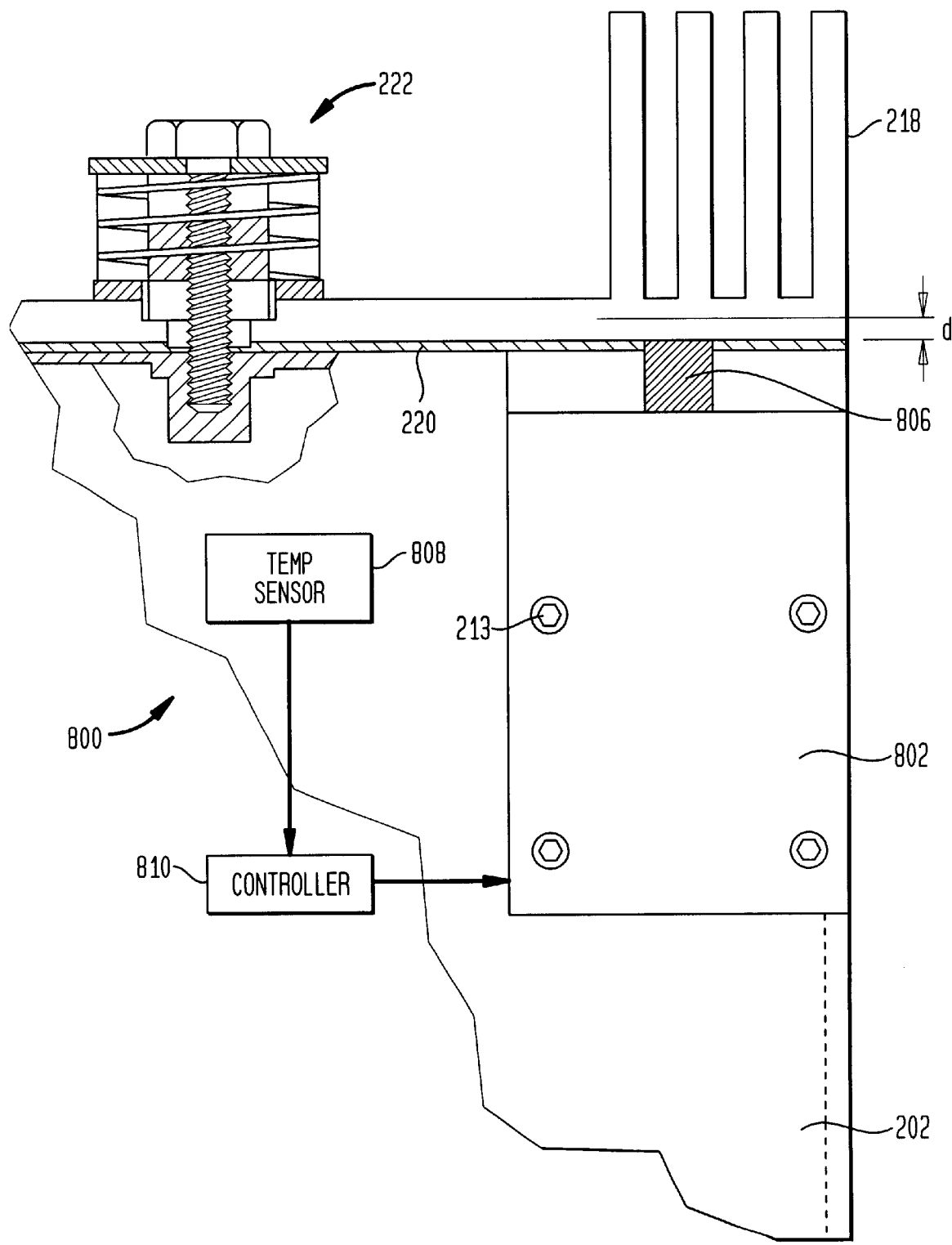

And, FIG. 8 is a partial cross-section of a fourth embodiment of a thermal management system according to the invention.

It is noted that the figures are not drawn to scale.

DETAILED DESCRIPTION OF THE PRESENT EMBODIMENTS

Figure 1:
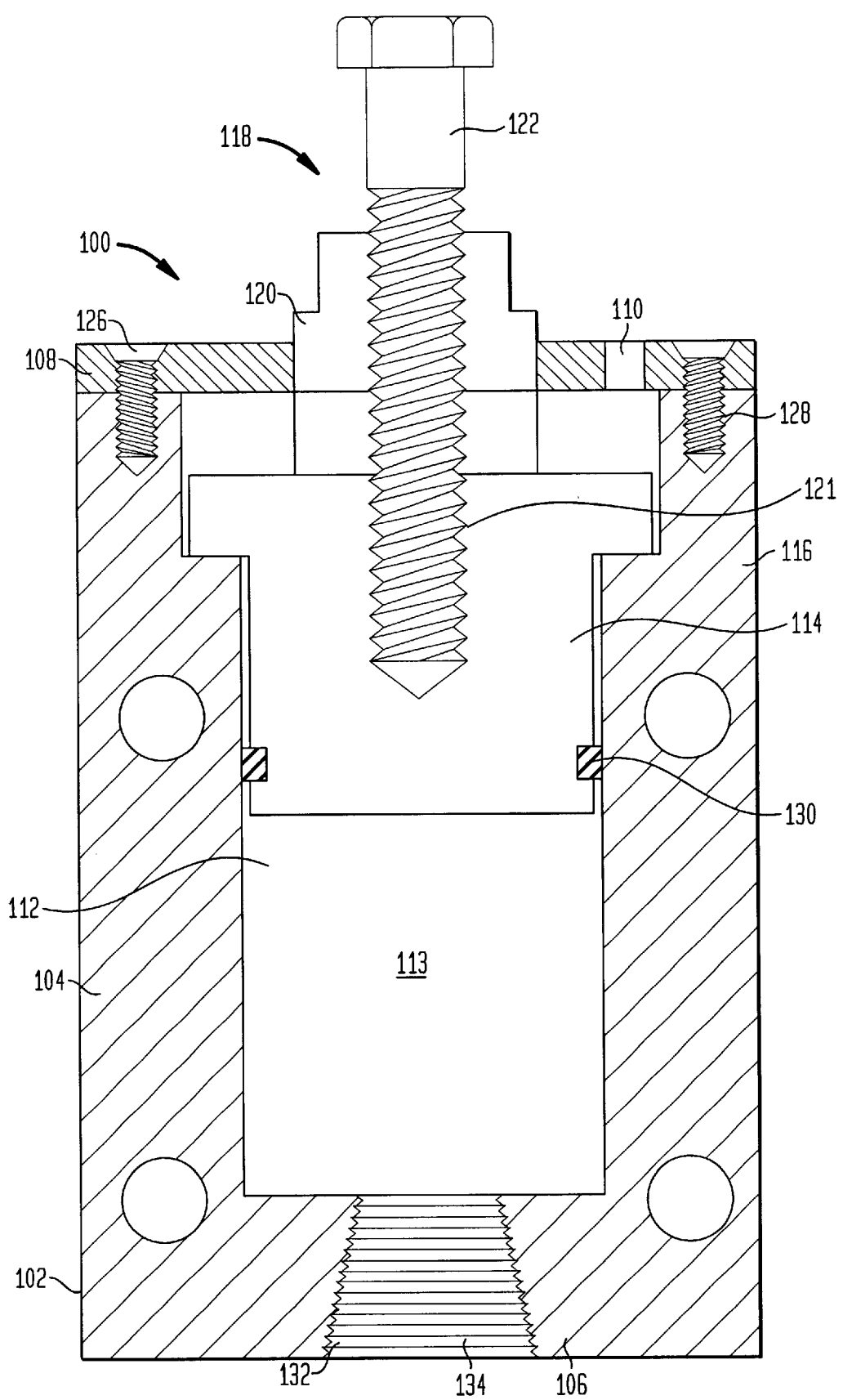
FIG. 1 is a cross-sectional view of a first embodiment of a solidification engine according to the invention.

FIG. 1 is a cross-sectional view of a first embodiment of a solidification engine according to the invention.

In more detail, FIG. 1 depicts a solidification engine 100 that includes an enclosure 102. The enclosure 102 can be a one-piece pressure vessel having sidewalls 104, a bottom 106. A top plate or head 108 having a vent 110 is positioned in contact with the sidewalls 104. A piston 114 is positioned inside the enclosure 102 so as to define a chamber 112. In the chamber 112 is a substance 113 that has the characteristic of expanding in volume upon solidification/freezing, while contracting in volume upon liquefaction/melting. Examples of such a substance 113 include water (sterile, distilled water being the preferred substance), a solution that includes water, and the element gallium (Ga).

The piston 114 (in cross-section) can be T-shaped so as to be restrained in motion toward the bottom 106 by shoulders 116 of the sidewalls 104. The solidification engine 100 further includes an adjustment piston rod assembly 118, formed of a lock-nut 120, a threaded hole 121 in the piston 114 and a threaded bolt 122. Screws 126 attach the top plate 108 to the sidewalls 104. Mounting holes 128 can be formed in the sidewalls 104.

The enclosure 102 can be made of poly-carbonate while the piston 114 can be made of DELRIN brand of plastic.

A quad O-ring 130 is used to make a pressure seal between the piston 114 and the sidewalls 104. It can be formed of a polymer material. The bottom 106 has a threaded fill-hole 132 into which fits a threaded plug 134.

Figure 2:
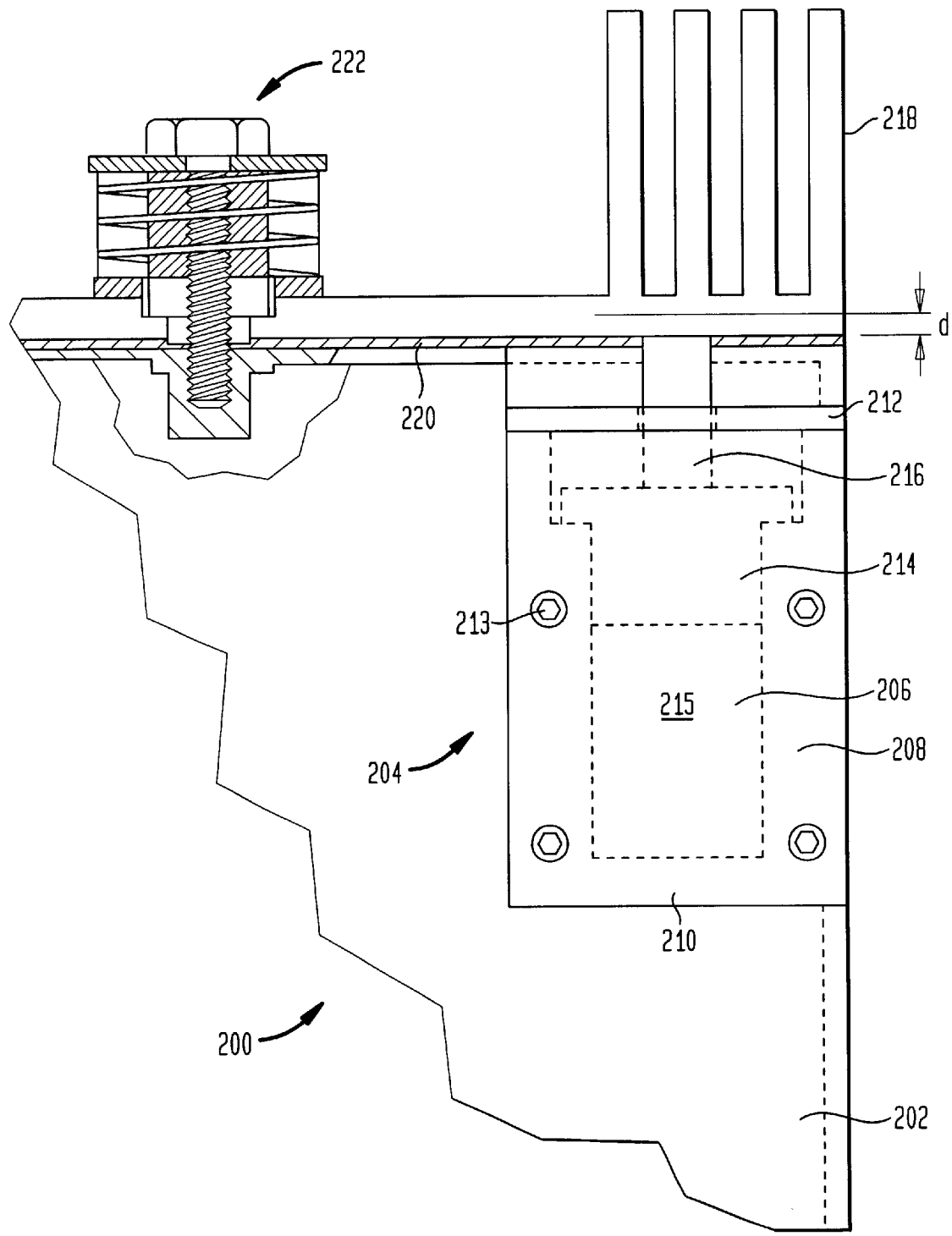
FIG. 2 is partial cross-section of a thermal management system incorporating the solidification engine of FIG. 1.

FIG. 2 is partial cross-section of a thermal management system incorporating the solidification engine of FIG. 1.

In more detail, the thermal management system 200 of FIG. 2 includes a cabinet 202 housing electronic circuitry (electronics) (not depicted). Attached either to inside or to outside of the cabinet 202 via the threaded bolts 213 is a solidification engine 204 such as that depicted in FIG. 1. Again, the solidification engine 204 has a chamber 206 defined by sidewalls 208, a bottom 210 and a piston 214. A top plate 212 attached to the sidewalls 208. Inside the chamber 206 is a substance 215 that expands upon freezing and contracts upon thawing/melting.

A piston rod 216 connects the piston 214 to a heat sink 218. A thermal coupling material (such as a compressible thermal coupling material) 220 is positioned in contact between the enclosure 202 and the heat sink 218. A thermally-isolated compression spring assembly 222 of known construction biases the heat sink 218 against the enclosure 202.

Figure 3:
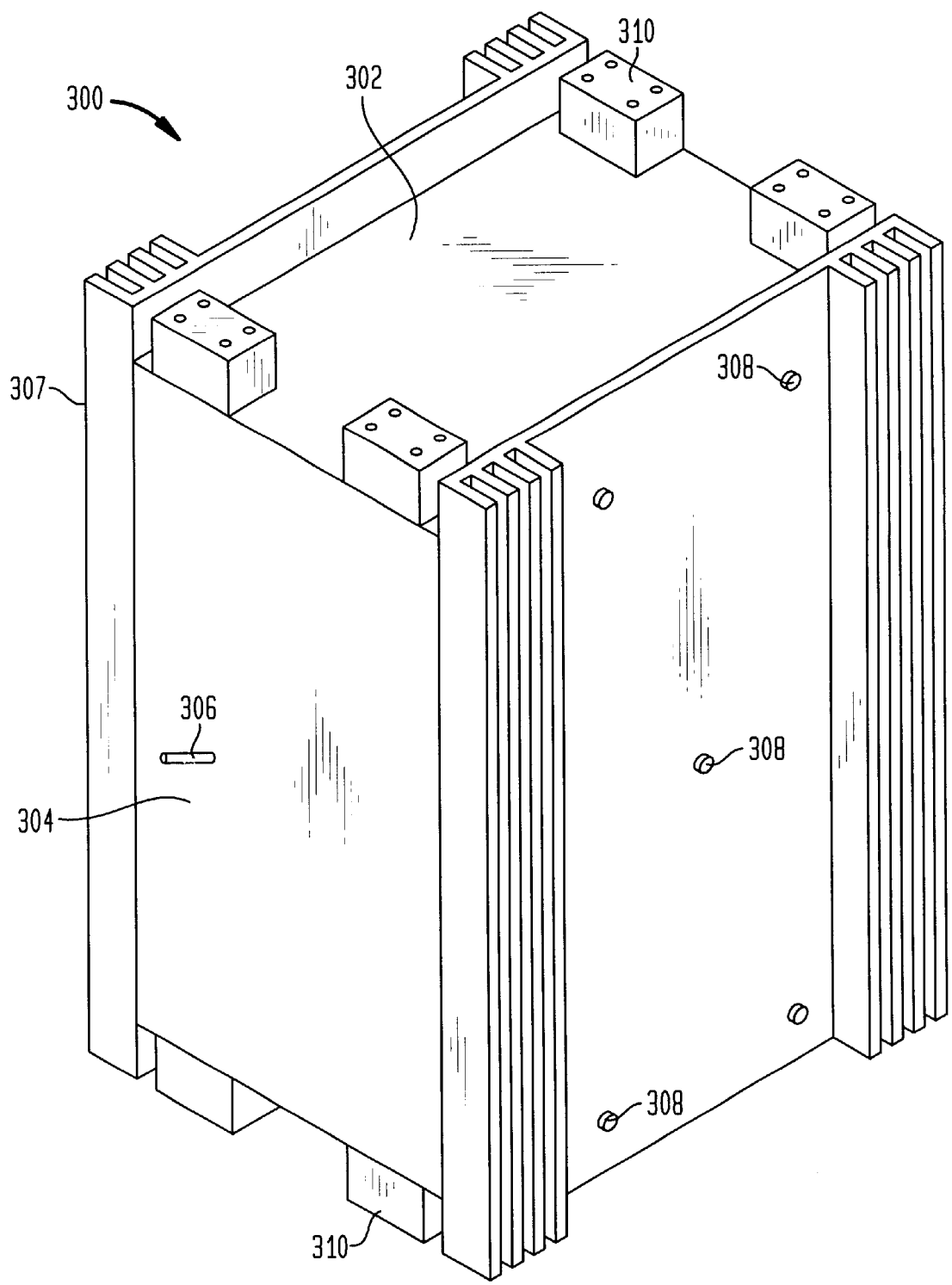
FIG. 3 is a three-quarter perspective depiction of the thermal management system of FIG. 2.

FIG. 3 is a three-quarter perspective depiction of the thermal management system of FIG. 2.

In more detail, the thermal management system 300 includes a cabinet 302 (e.g., approximately 6.75 cubic feet in volume) depicted as having a door 304 with a handle 306 through which access is available to electronic circuitry (electronics) (not depicted) that are housed within the cabinet 302. Alternatively, this cabinet 302 can be significantly larger, for example, large enough for an adult to stand inside. For this alternative, it is noted that the thermal management system would need to be correspondingly scaled in capacity.

Heat sinks 307, which can be larger in size than a side of the cabinet 302, are positioned in contact with the cabinet 302 in a manner similar to that depicted in FIG. 2 (not depicted here in as much detail, for simplicity). Multiple thermally-isolated compression spring assemblies 308 bias the heat sink 307 against the sides of the enclosure 302. Multiple solidification engines 310 are positioned at corners of the heat sinks 307.

FIG. 4A is a cross-section of a second embodiment of a solidification engine according to the invention.

In more detail, the solidification engine 400 includes a top-half 402A of an enclosure and a bottom-half 402B of the enclosure. A piston 404 is disposed within the enclosure 402A/402B so as to define a chamber 406. A stretchable membrane 408 is disposed between the top-half of the enclosure 402A and the bottom-half of the enclosure 402B. The top-half of the enclosure 402A and the bottom-half of the enclosure 402B can be held together via bolts oriented along the line 412.

FIG. 5A is a third embodiment of the solidification engine according to the invention.

In more detail, the system 500 includes the same top-half 402A and bottom-half 402B of the enclosure of FIG. 4A. The embodiment of FIG. 5A differs from the embodiment of FIG. 4A in the configuration of the piston 404 and in the use of a stretch-resistant diaphragm 504 (also referred to as a rolling diaphragm).

Though the piston 502 is T-shaped as is the piston 404 of FIG. 4, the body of the piston 502 is not fitted closely against the enclosure top-half 402A such that a gap 506 in between exists. Extra lengths 508 of the stretch-resistant diaphragm 504 are folded into the gaps 506.

To reiterate, FIGS. 4A and 5A depict alternative techniques for sealing the enclosure (or pressure vessel).

Figure 6:
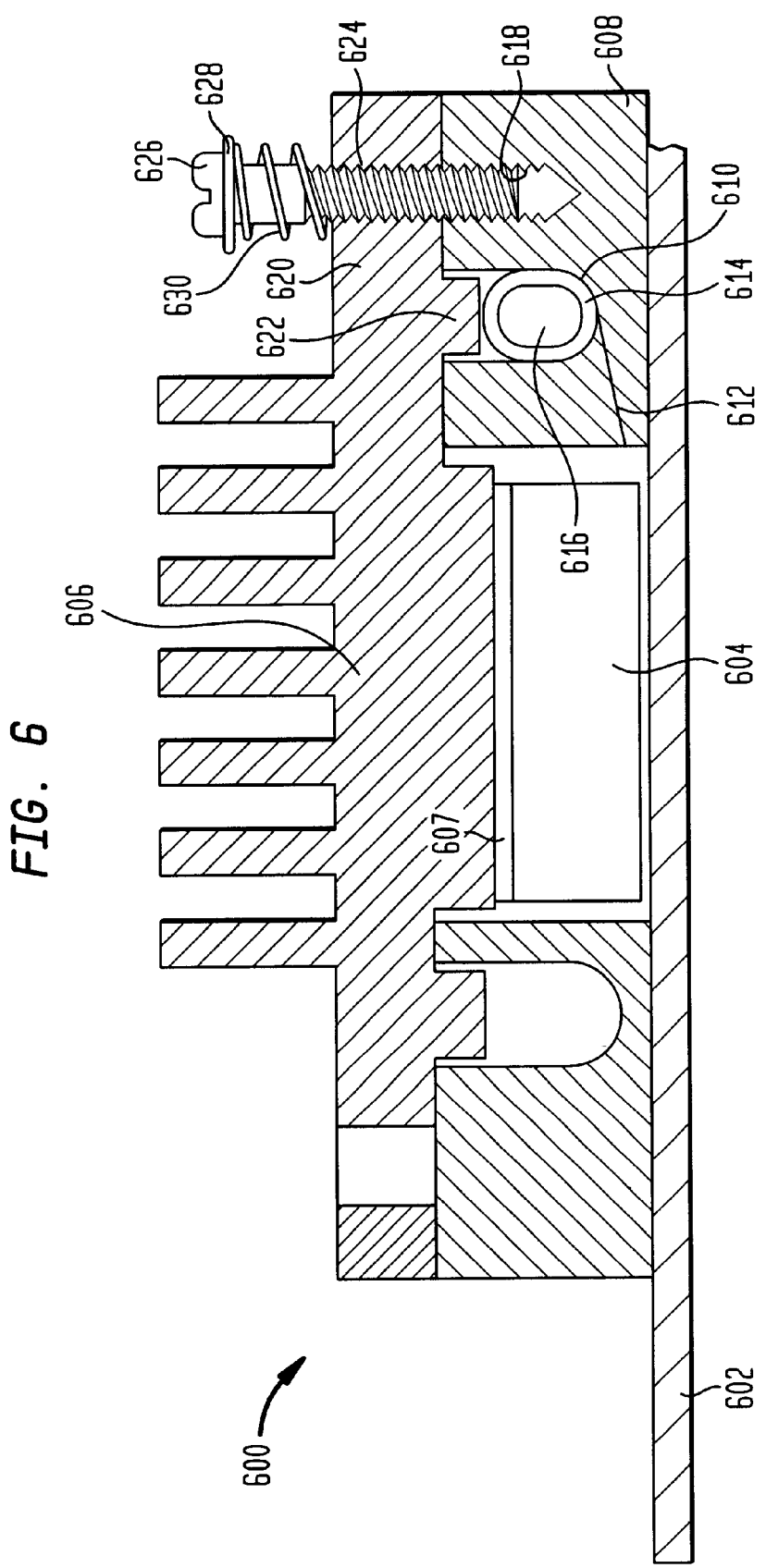
FIG. 6 is a second embodiment of a thermal management system incorporating a fourth embodiment of a solidification engine according to the invention.

FIG. 6 is a second embodiment of a thermal management system incorporating a fourth embodiment of a solidification engine according to the invention.

In more detail, the system 600 includes a printed wiring board (PWB) 602 to which is attached an integrated circuit (IC) or other electronic component 604 (e.g., an oscillator) which requires thermal management. A heat sink 606 is positioned against the top of the IC 604 and can be thermally connected to it via a thermal coupling material 607.

It is noted that FIG. 6 is drawn asymmetrically, with much greater detail presented in the right-hand side of the FIG. 6 than in the left-hand side, for simplicity.

A solidification engine is defined primarily by a female enclosure structure 608 positioned between the PWB 602 and the male enclosure 620 of the heat sink 606. The male 620 and the female 608 are complimentarily shaped.

The female enclosure structure 608 includes a socket 610 having a small air vent 612 located at the bottom of the socket 610. In the socket 610 is located a capsule 614 that encloses a substance 616 that expands upon freezing and contracts upon melting. The capsule 614 looks in appearance much like a vitamin E capsule. The vent 612 is small enough that the capsule 614 cannot expand into it. The vent 612 is desirable to facilitate insertion of the capsule 614 into the socket 610.

The female enclosure structure 608 further includes a threaded hole 618 that can receive a threaded bolt 626.

The male enclosure structure 620 of the heat sink 606 includes a boss or projection 622 dimensioned to fit in the opening of the socket 610. The male enclosure structure 620 also includes a clearance-hole 624 through which passes the bolt 626. A washer is used to increase the surface area of the head of the bolt 626 and a spring 630 is used to bias the washer away from the male enclosure structure 620. The threaded hole 618, the clearance-hole 624, the bolt 626, the washer 628 and the spring 630 define a compression spring assembly.

Figure 7:
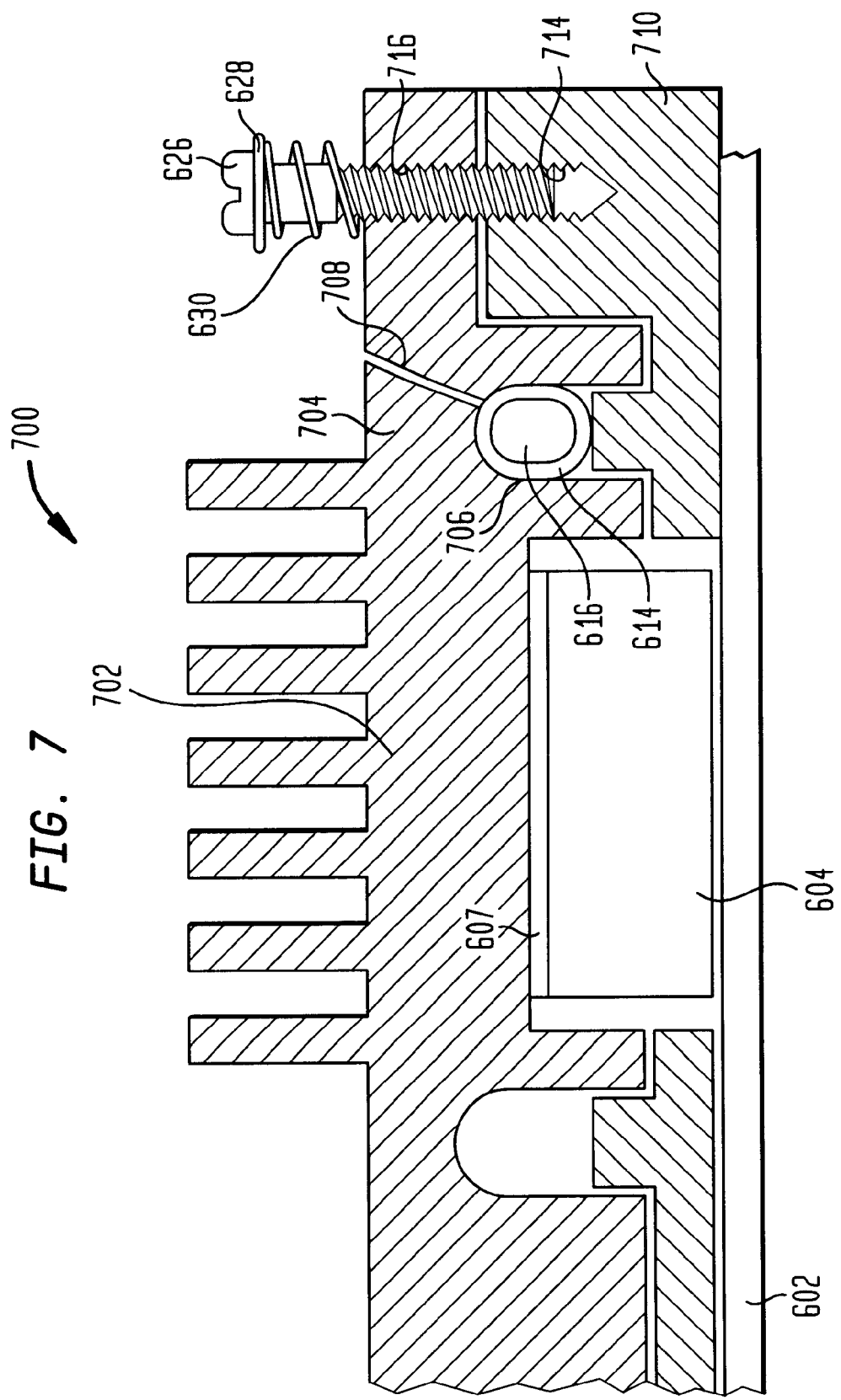
FIG. 7 is a third embodiment of a thermal management system incorporating a fifth embodiment of a solidification engine according to the invention, wherein the solidification engine of FIG. 7 is the compliment of the solidification engine of FIG. 6.

FIG. 7 is a third embodiment of a thermal management system incorporating a fifth embodiment of a solidification engine according to the invention, wherein the solidification engine of FIG. 7 is the compliment or gender reversal of the solidification engine of FIG. 6. Like FIG. 6, FIG. 7 is drawn asymmetrically for simplicity.

In more detail, the system 700 of FIG. 7 includes a heat sink 702 having a female enclosure structure 704 that includes a socket 706 and an air vent 708 at or near the most deeply recessed part of the socket 706. A male enclosure 710 is interposed between the PWB 602 and the female enclosure structure 704. The male 710 and the female 704 are complimentarily shaped.

A threaded hole 714 is formed in the male enclosure structure 710 and a corresponding clearance-hole 716 is formed in the female enclosure structure 704. Boss or projection 712, part of the male enclosure 710, acts as a stationary piston. Along with the threaded bolt 626, the washer 628 and the spring 630, threaded hole 714 and the clearance-hole 716 define a compression spring assembly.

FIG. 8 is a partial cross-section of a fourth embodiment of a thermal management system according to the invention.

In more detail, FIG. 8 depicts a system 800 that is similar to the system 200 of FIG. 2 except that a solenoid 802 is used instead of the solidification engine 204. As a result, the system 800 also needs a temperature sensor 808 and a controller 810.

Operation of the Present Embodiments

In FIG. 1, the substance 113 can be introduced to the chamber 112 as follows. The enclosure 102 is inverted so that the fill-hole 132 is located above the piston 114. The substance 113 is poured into the chamber 112 until it is filled. Then, the plug 134 is repositioned in the fill-hole 132.

Reversible motion of the solidification engine 100 will be described. When the substance 113 freezes, it will expand, forcing the piston 114 toward the top-plate 108. Accordingly, the vent 110 is provided to permit air to escape. The vent 110 is sized so as to permit the air between the piston 114 and the top-plate 104 to escape fast enough so that no pressure builds therebetween. When the substance 113 melts, the piston 114 tends to move back toward the plug 134.

The distance of the piston rod 118 from the reference point on the solidification engine 100, such as the surface of the top-plate 108, can be varied with the adjustment piston rod 118. The lock-nut 120 is loosened so that the bolt 122 can be screwed further into the threaded hole 121 or unscrewed out of the threaded hole 121. At the desired extension of the bolt 122 away from the top surface of the plate 108, the lock-nut 120 can be tightened so as to fix the bolt 122 in place. This permits a user to set a desired small gap (if any) between the top of the bolt and a heat sink (not shown, but see FIG. 2).

When water or a solution that includes water, is used as the substance 113, a great force can be generated by the piston as it moves away from the plug 134 in response to the expansion of freezing water in the form of ice. An example of the force that can be generated by a 1-inch square area of water will be calculated. The expansion force of ordinary ice is known to be at least 30,000 pounds per square foot. The force of ice $f_{ice}$ is at least 208.333 pounds per square inch. An example of how tall a column of water is needed to move the piston 0.10 inches will be described. It is known that the volume of ice is equal to 1.0855 times the volume of water. Thus, 1.0855 H=H+0.10. This yields a height of a column of water equal to 1.1696 or approximately 1.17 inches. The diameter of a 1-inch square area is r=0.564 inches. Thus, the force and travel generated are great enough to do the required work.

It is expected that the compression crush strength of ice is sufficient to support, e.g., the example force described above.

It is also noted that the freezing point of the ice varies slightly due to pressure. This phenomenon is expected to only negligibly affect operation of the solidification engine according to the invention. The freezing point of ice increases by 0.0133° F. per one atmosphere. It would take a pressure of 1000 atmospheres to lower the freezing point 1.3° F.

The solidification engine 100 can be optimized to actuate at different temperatures in several fashions. One way is to provide a thermal coupling path from the solidification engine 100 to the electronics instead of isolating it. This will warm the substance 113, e.g., water, requiring the outside temperature to be colder than 0° C. before the water will drop to the freezing point. The efficiency of this coupling can be engineered to the desired combination of internal heat and outside temperature, which together, allow the solidification engine 100 to actuate at a chosen outside temperature below 0° C. Another possible way of engineering the temperature at which a solidification engine (that uses water) actuates is to modify the freezing point, such as by adding salt to the water.

The speed of reaction to temperature changes can also be engineered by choosing a material with different thermal conduction properties for the enclosure 102. The solidification engine 100 will actuate more quickly with a thermally conductive version of enclosure 102 than it will with a thermally insulative version of enclosure 102.

In the system 200 of FIG. 2, when the substance 215 is melted, i.e., in the liquid state, the heat sink 218 is biased against the enclosure 202 via the compression spring assembly 222. But when the substance 215 freezes, it expands and moves the piston 214 away from the bottom 210 of the enclosure 208 of the solidification engine 204. This drives the piston rod 216 against the heat sink 218, which causes the heat sink 218 to move a distance d away from the enclosure 202. This breaks the thermal connection between the heat sink 218 and the enclosure 202.

As noted above, the solidification engine 204 can be mounted either outside the cabinet 202 (as depicted) or inside the cabinet 202 (not depicted). The choice of mounting location depends upon whether one desires to lower the required outside temperature at which the solidification engine will actuate, in which case an inside mount is preferred.

In the system 300 of FIG. 3, the heat sinks 307 are moved away from the cabinet 302 as depicted in FIG. 2. The cabinet 302 might house the circuitry of a wireless base station.

In FIG. 4A, the stretchable membrane 408 is clamped between the top and bottom halves 402A and 402B of the enclosure via bolts (not depicted). This seals the substance 409 inside the chamber 406. FIG. 4A depicts the condition in which the substance 409 is in the liquid state. FIG. 4B is an abbreviated cross section that depicts the condition in which the substance 409 has frozen. Portions 410 of the stretchable membrane 408 are the principal stretched portions.

Similar to FIG. 4A, FIG. 5A depicts the condition in which the substance 409 is in the liquid state. In contrast, FIG. 5A is an abbreviated cross-section of FIG. 5A showing the condition in which the substance 409 is frozen, i.e., expanded. The folded portions 508 of the stretch resistant membrane 504 have unfolded as the piston 502 has been moved upward.

In the operation of FIG. 6, the capsule 614 takes the place of the quad o-ring 130 of FIG. 1, the stretchable membrane 408 of FIG. 4A or the stretch resistant membrane 508 of FIG. 5A by totally enclosing the substance 616. The projection 622 acts like the pistons 114, 214, 404 or 502. Upon expansion of the substance 616 due to freezing, a gap is produced between the heat sink 606 and the electronic component 604 so that the thermal connection therebetween is broken.

FIG. 7 is the compliment to FIG. 6. In other words, the heat sink 702 has the female enclosure structure 704 while the structure 710 interposed between it and the PWB 602 has a corresponding male configuration. Otherwise, the thermal management systems 600 and 700 operate in basically the same manner.

In FIG. 8, the controller 810 monitors the temperature sensed by the temperature sensor 808. If the temperature drops below a predetermined level, the controller energizes the solenoid 802 to extend the extensible pin 806. This causes the heat sink 218 to move a distance d away from the enclosure 202, thereby breaking the thermal connection therebetween.

It is noted that the solenoid 802, the temperature sensor 808 and the controller 810 can replace any of the solidification engine embodiments. But this is less preferred because, e.g., it is more expensive and/or less reliable in very cold temperatures.

It is noted that commercially available cylinders can be adapted to be solidification engines, primarily by replacing their recommended fluid with one of the substances discussed in this document. Such an adaptation changes the function of the fluid otherwise used in a commercially available cylinder from being merely a medium that transfers energy imparted by an external energy source (such as a pump) into being the energy source as well as the transfer medium.

An advantage of the thermal management systems according to the invention is that they solve the problem of heat sinks becoming a liability at low temperatures by breaking the thermal connection to the circuitry rather than by generating compensation heat as in the Background Art. As such, the systems of the invention are much simpler and less expensive. Moreover, the embodiments employing the solidification engines according to the invention do not require a source of power other than the ambient environment to which the system of which they are a part is exposed.

A particular advantage of the embodiment of FIGS. 6–7 is that they can take the form of micro-thermal-management-systems. That is, these systems can be implemented on one IC or other electronic component of many on a printed wire board (PWB). In contrast, the embodiments of FIGS. 2 and 8 are applied to all of the circuitry in a cabinet.

An advantage of the solidification engines are that they exhibit very efficient power to size and power to weight ratios. In addition, they are passive devices not requiring a supply of energy such as electricity.

A further advantage of the thermal management systems according to the invention, especially those employing the solidification engine, is that their simplicity greatly improves their reliability.

Objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A solidification engine comprising:
    an enclosure having an opening;
    a substance in said enclosure, that expands upon transition from a liquid to a solid, wherein
    said substance is enclosed in a bladder; and
    a movable plug fitted to said opening by said enclosure to seal said substance;
    wherein reversible motion of said movable plug relative to said enclosure is imparted when said substance freezes from a liquid to a solid or melts from a solid to a liquid.

2. The solidification engine of claim 1, wherein said movable plug is a piston and said enclosure is a cylinder into which fits said piston.

3. The solidification engine of claim 1, further including one of a stretch resistant diaphragm and stretchable membrane between said piston and said substance to seal said substance inside said cylinder.

4. The solidification engine of claim 1, wherein said movable plug is unitary with a portion of a structure that is desired to be moved by said solidification engine.

5. The solidification engine of claim 1, wherein said substance is water or a solution that includes water.

6. A thermal management system comprising:
    a structure to be cooled;
    a heat sink thermally connected to the structure-to-be-cooled;
    at least one solidification engine arranged to break the thermal connection between said heat sink and said structure-to-be-cooled depending upon a temperature to which said solidification engine is exposed.

7. The system of claim 6, wherein said solidification engine that includes:

an enclosure having an opening;

a substance, in said enclosure, that expands upon transition from a liquid to a solid; and a movable plug fitted to said opening in said enclosure to seal said substance;

wherein reversible motion of said movable plug relative to said enclosure is imparted when said substance freeze from a liquid to a solid, to thus break said thermal connection, or melts from ice to water, to thus restore said thermal connection.

8. The system of claim 7, wherein said movable plug is a piston and said enclosure is a cylinder into which fits said piston.

9. The system of claim 8, further comprising a piston ring fitted between said piston and said cylinder to seal said substance inside said cylinder.

10. The system of claim 8, further comprising one stretch resistant diaphragm and stretchable membrane between said piston and said substance to seal said substance inside said cylinder.

11. The system of claim 7, wherein said substance is enclosed in a bladder.

12. The system of claim 7, wherein said movable plug is unitary with a portion of a structure that is desired to be moved by said solidification engine.

13. The system of claim 12, wherein said movable plug is a one-piece construction with said heat sink.

14. The system of claim 6, wherein said system further includes a bias arrangement to bias said heat sink against said structure-to-be-cooled so as to preserve the thermal connection therebetween.

15. The system of claim 14, wherein said bias arrangement is a compression spring assembly.

16. The system of claim 6, wherein said structure-to-be-cooled is an electronic component, and wherein said heat sink is either in direct physical contact with said electronic component or said heat sink is thermally connected to said electronic component via a thermally conductive material.

17. The system of claim 6, wherein said structure-to-be-cooled is a cabinet that houses electronic circuitry.

18. The system of claim 17, wherein said heat sink substantially overlaps an entirety of a wall of said cabinet.

19. The system of claim 6, wherein said substance is water or a solution that includes water.

20. The system of claim 6, wherein said engine is a solenoid, the system further comprising a controller and a temperature sensor, said controller being operable to energize said solenoid as a function of temperature sensed by said temperature sensor.

* * * * *